(12) United States Patent
Kashiwagi (10) Patent No.: US 8,762,975 B2
(45) Date of Patent: Jun. 24, 2014

(54) PERFORMANCE TUNING APPARATUS, PERFORMANCE TUNING METHOD, AND COMPUTER PRODUCT

(75) Inventor: Chizuru Kashiwagi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1505 days.

(21) Appl. No.: 11/524,384

(22) Filed: Sep. 21, 2006

(65) Prior Publication Data

US 2007/0220489 A1 Sep. 20, 2007

(30) Foreign Application Priority Data

Mar. 17, 2006 (JP) .................................. 2006-075394

(51) Int. Cl.
*G06F 9/45* (2006.01)

(52) U.S. Cl.
USPC .......................................... 717/158; 717/151

(58) Field of Classification Search
None
See application file for complete search history.

(56) References Cited

U.S. PATENT DOCUMENTS

| | | | |
|---|---|---|---|
| 5,485,574 A | | 1/1996 | Bolosky et al. |
| 5,787,285 A * | | 7/1998 | Lanning ........................ 717/130 |
| 5,966,538 A * | | 10/1999 | Granston et al. .............. 717/158 |
| 6,959,431 B1 * | | 10/2005 | Shiels et al. .................. 717/124 |
| 7,222,269 B2 | | 5/2007 | Kurinami et al. |
| 7,546,598 B2 * | | 6/2009 | Blumenthal et al. ............. 718/1 |
| 2003/0110421 A1 | | 6/2003 | Kurinami et al. |
| 2004/0093589 A1 * | | 5/2004 | Master .......................... 717/136 |
| 2004/0255282 A1 * | | 12/2004 | Eruhimov et al. ............ 717/151 |
| 2007/0033578 A1 * | | 2/2007 | Arnold et al. ................. 717/130 |

FOREIGN PATENT DOCUMENTS

| | | |
|---|---|---|
| JP | 62-169238 | 7/1987 |
| JP | 7-182209 | 7/1995 |
| JP | 07-191882 | 7/1995 |
| JP | 08-263372 | 10/1996 |
| JP | 2003-173277 | 6/2003 |
| JP | 2003-316611 | 11/2003 |

OTHER PUBLICATIONS

Tian, "Integrating Time Domain and Input Domain Analyses of Software Reliability Using Tree-Based Models", 1995, IEEE Transactions on Software Engineering, vol. 21, No. 12.*

Folkesson et al. "Considering Workload Input Variations in Error Coverage Estimation", 1999, Lecture Notes in Computer Science, vol. 1667.*

Hsu et al. "On the Predictability of Program Behavior Using Different Input Data Sets", 2002, Proceedings of the Sixth Annual Workshop on Interaction between Compilers and Computer Architectures.*

Bell et al. "ParaProf: A Portable, Extensible, and Scalable Tool for Parallel Performance Profile Analysis", 2003, Lecture Notes in Computer Science, vol. 2790.*

(Continued)

*Primary Examiner* — Jue Louie
(74) *Attorney, Agent, or Firm* — Staas & Halsey LLP (57) ABSTRACT

In performance tuning, a program is created by development engineers. Data A, data B, data C, . . . are given to the program to execute the program. Performance index values of functions for each data are measured. The results of the measurement are combined for each function and combining results and the number of times of combining (experience value) are obtained. Based on the combining results, the targets of the tuning functions are selected. Performance index values are combined for each function selected. The functions to be the tuning targets are output as tuning points.

6 Claims, 7 Drawing Sheets

(56) References Cited

OTHER PUBLICATIONS

Arnold et al. "Improving Virtual Machine Performance Using a Cross-Run Profile Repository", Oct. 2005, Proceedings of the 20th annual ACM SIGPLAN conference on Object-oriented programming, systems, languages, and applications.*

Fisher et al. "Predicting Conditional Branch Directions From Previous Runs of a Program", 1992, Proceedings of the fifth international conference on Architectural; support for programming languages and opertating systems.*

Savari et al. "Comparing and Combining Profiles", 2000, Journal of Instruction Level Parallelism.*

Valerie Barr "Quantitative Performance Prediction for Rule-Based Expert Systems", 1998, AAAI Technical Report WS-98-11.*

Japanese Office Action issued Jul. 5, 2011 in corresponding Japanese Patent Application 2006-075394.

Japanese Office Action mailed May 28, 2013 in corresponding Japanese Patent Application No. 2011-27935.

* cited by examiner

| INPUT DATA | PARAMETER TYPE | CANDIDATE TUNING POINT Fk | |
|---|---|---|---|
| | | FUNCTION F3 | FUNCTION F4 |
| DATA D1 | NUMBER OF CYCLES OF COMBINING ORIGIN | 20 | 50 |
| | VPC | 0.8 | 0.6 |
| | COMBINING ORIGIN INDEX VALUE NUMBER OF CYCLES OF COMBINING ORIGIN×(1-VPC) | 4 | 20 |
| DATA D2 | NUMBER OF CYCLES OF COMBINING ORIGIN | 70 | 30 |
| | VPC | 0.7 | 0.5 |
| | COMBINING ORIGIN INDEX VALUE NUMBER OF CYCLES OF COMBINING ORIGIN×(1-VPC) | 21 | 15 |
| COMBINED INDEX VALUE Tk | NUMBER OF CYCLES OF COMBINING ORIGIN×(1-VPC) | 25 | 35 |

PERFORMANCE TUNING APPARATUS, PERFORMANCE TUNING METHOD, AND COMPUTER PRODUCT

CROSS-REFERENCE TO RELATED APPLICATIONS

This application is based upon and claims the benefit of priority from the prior Japanese Patent Application No. 2006-075394, filed on Mar. 17, 2006, the entire contents of which are incorporated herein by reference.

BACKGROUND OF THE INVENTION

1. Field of the Invention

The present invention relates to a technology of performance tuning of programs.

2. Description of the Related Art

A "tuning technique" is to extract, as a tuning point, a function that indicates a performance index (for example, the number of cycles or the cache mistake rate) corresponding to a cause of degradation in a processing speed, to allow a created program to run efficiently.

Specifically, to execute tuning of a program using this tuning technique, certain data is input to conduct a performance analysis, and a tuning point is extracted based on a result of the performance analysis. Thus, tuning is executed on the tuning point. For efficient tuning, it is important to accurately find the tuning point.

For example, in the case of a program for a moving picture experts group (MPEG) decoder, when an expansion process takes time and reproduction can not catch up for compressed data, it can be considered that the number of cycles of the function for this expansion process is high. Therefore, the function is extracted as the tuning point to improve processing efficiency of the program.

In such tuning technique, an execution frequency, an instruction fetching frequency, a memory access frequency, and a cache mistake rate are measured and the tuning point is extracted based on a result of the measurement (for example, Japanese Patent Application Publication No. H8-1608, and Japanese Patent Laid-Open Publication Nos. H7-191882 and H8-263372).

However, according to the conventional tuning technique described above, it is difficult to accurately find the tuning point because the result of the measurement is often biased depending on the type of the input data. Therefore, the tuning point must be determined based on a comprehensive judgment through measurement repeated many times. As a result, a load on development engineers increases.

In an environment where the program performance can be represented both comprehensively and locally using the execution occupancy, the performance indexes, etc., of a program, when the result of the measurement of the performance differs depending on the type of input data, the development engineers identify a module that has a high execution frequency and for which a tuning effect is expected, based on human judgment by the engineers from each input data and each program characteristic.

Therefore, when more than one function having the same performance index value is present in measurement conducted once, and performance analysis and tuning are executed based on the result of this measurement, it is difficult to judge which function should be tuned, and therefore, it is difficult to accurately determine the tuning point.

Furthermore, if the program tuning is executed based on a result of measurement using only single input data Da, although the performance is improved when the input data Da is given, the performance can be even more degraded than the performance before execution of the tuning when another data Db is given.

SUMMARY OF THE INVENTION

It is an object of the present invention to at least solve the above problems in the conventional technologies.

A computer-readable recording medium according to one aspect of the present invention stores therein a performance tuning program that makes a computer execute acquiring a plurality of pieces of input data to be given to a target program; measuring, for each of the input data, a performance index value for each of functions that specify a function of the target program, by giving each of the input data to the target program to execute the target program; combining, for each of the functions, the performance index value of each of the input data; and extracting functions to be candidates for a tuning point from among the functions based on a result of combining at the combining.

A performance tuning apparatus according to another aspect of the present invention includes an acquiring unit configured to acquire a plurality of pieces of input data to be given to a target program; a measuring unit configured to measure, for each of the input data, a performance index value for each of functions that specify a function of the target program, by giving each of the input data to the target program to execute the target program; a combining unit configured to combine, for each of the functions, the performance index value of each of the input data; and an extracting unit configured to extract functions to be candidates for a tuning point from among the functions based on a result of combining by the combining unit.

A performance tuning method according to still another aspect of the present invention includes acquiring a plurality of pieces of input data to be given to a target program; measuring, for each of the input data, a performance index value for each of functions that specify a function of the target program, by giving each of the input data to the target program to execute the target program; combining, for each of the functions, the performance index value of each of the input data; and extracting functions to be candidates for a tuning point from among the functions based on a result of combining at the combining.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with reference to the accompanying drawings.

Figure 1:
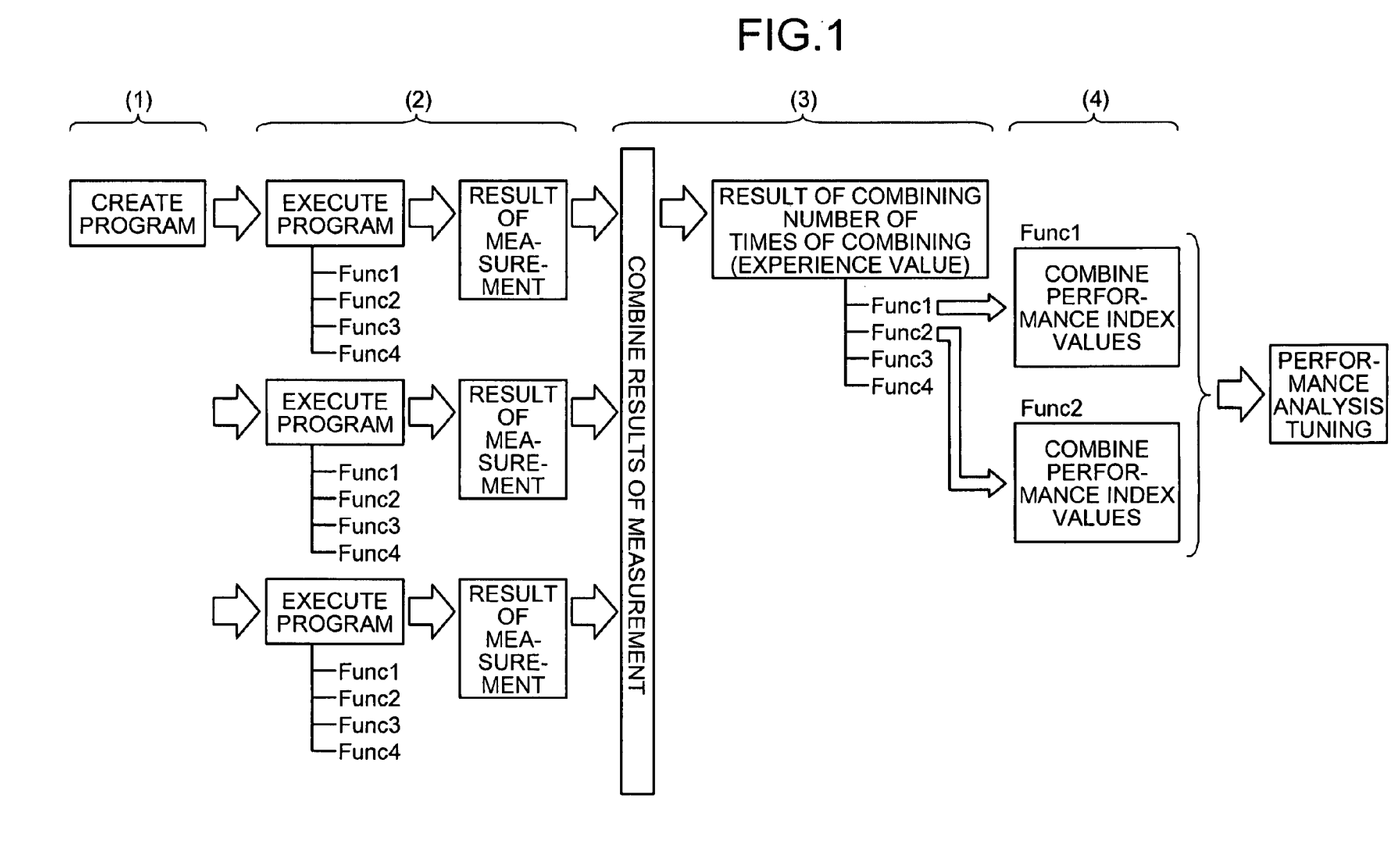
FIG. 1 is a schematic for illustrating an overview of performance tuning according to an embodiment of the present invention.

FIG. 1 is a schematic for illustrating an overview of performance tuning according to an embodiment of the present invention. At stage (1), a program is created by development engineers.

At stage (2), data A, data B, data C, . . . are given to the program, and the program is executed. As a result of measurement, performance index values of functions (Func1 to Func4) for each data are measured.

At stage (3), the results of the measurement are combined for each function, and a result of combining and the number of times of combining (experience value) are obtained. In this example, among the functions Func1 to Func4, functions Func1 and Func2 are to be the tuning targets based on the result of combining.

At stage (4), performance index values are combined for each function selected at stage (3). Thus, a function that should be the tuning target can be output as a tuning point.

Figure 2:
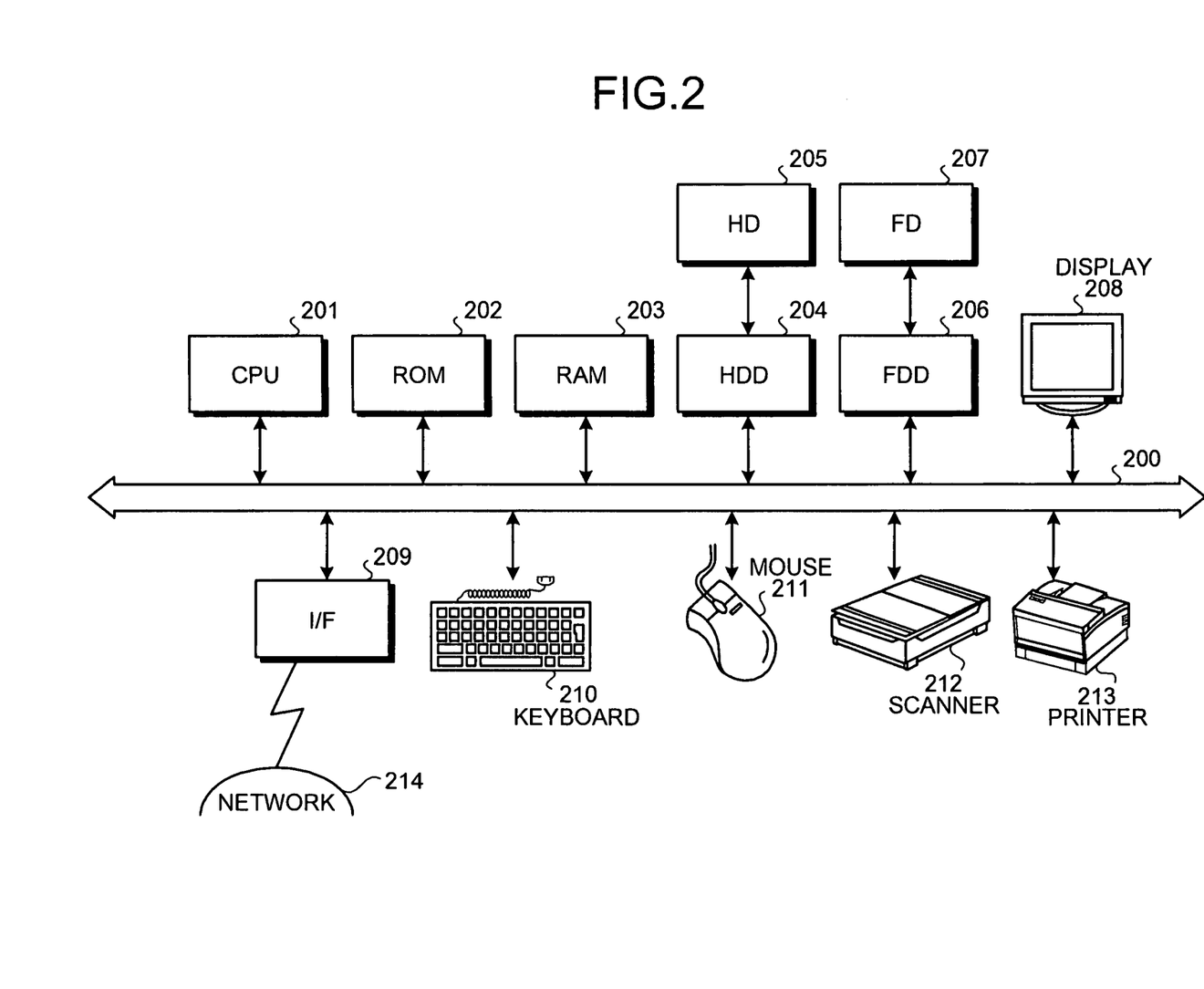
FIG. 2 is a schematic of a hardware configuration of a performance tuning apparatus according to the embodiment.

FIG. 2 is a schematic of a hardware configuration of a performance tuning apparatus according to the embodiment. As shown in FIG. 2, the performance tuning apparatus includes a central processing unit (CPU) 201, a read-only memory (ROM) 202, a random access memory (RAM) 203, a hard disk drive (HDD) 204, a hard disk (HD) 205, a flexible disk drive (FDD) 206, a flexible disk (FD) 207 as an example of a removable recording medium, a display 208, an interface (I/F) 209, a keyboard 210, a mouse 211, a scanner 212, and a printer 213. Each component is connected via a bus 200 with each other.

The CPU 201 controls the entire performance tuning apparatus. The ROM 202 stores programs such as a boot program. The RAM 203 is used as a work area of the CPU 201. The HDD 204 controls reading/writing of data from/to the HD 205 according to the control of the CPU 201. The HD 205 stores data written according to the control of the HDD 204.

The FDD 206 controls reading/writing of data from/to the FD 207 according to the control of the CPU 201. The FD 207 stores the data written by the control of the FDD 206, and allows the performance tuning apparatus to read the data stored in the FD 207.

As a removable recording medium, in addition to the FD 207, a compact-disc read-only memory (CD-ROM), a compact-disc recordable (CD-R), a compact-disc rewritable (CD-RW), a magneto optical (MO) disk, a digital versatile disk (DVD), and a memory card may be used. In addition to a cursor, and icons or tool boxes, the display 208 displays data such as texts, images, functional information, etc. This display 208 may employ, for example, a cathode ray tube (CRT), a thin film transistor (TFT) liquid crystal display, a plasma display, etc.

The I/F 209 is connected to a network 214 such as the Internet through a communication line, and is connected to external apparatuses through the network 214. The I/F 209 administers an internal interface with the network 214 and controls input/output of data to/from external apparatuses. For example, a modem, a local area network (LAN) adaptor, etc., may be employed as the I/F 209.

The keyboard 210 includes keys for inputting letters, digits, various instructions, etc., and executes input of data. The keyboard 210 may be a touch-panel input pad or a numeric key pad, etc. The mouse 211 executes shift of the cursor, selection of a region, or a change of position and size of windows. The mouse 211 may be a track ball or a joy stick that similarly includes the function as a pointing device.

The scanner 212 optically reads images and captures image data into the performance tuning apparatus. The scanner 212 may have an optical character recognition (OCR) function. The printer 213 prints image data and text data. For example, a laser printer or an ink jet printer may be employed as the printer 213.

Figure 3:
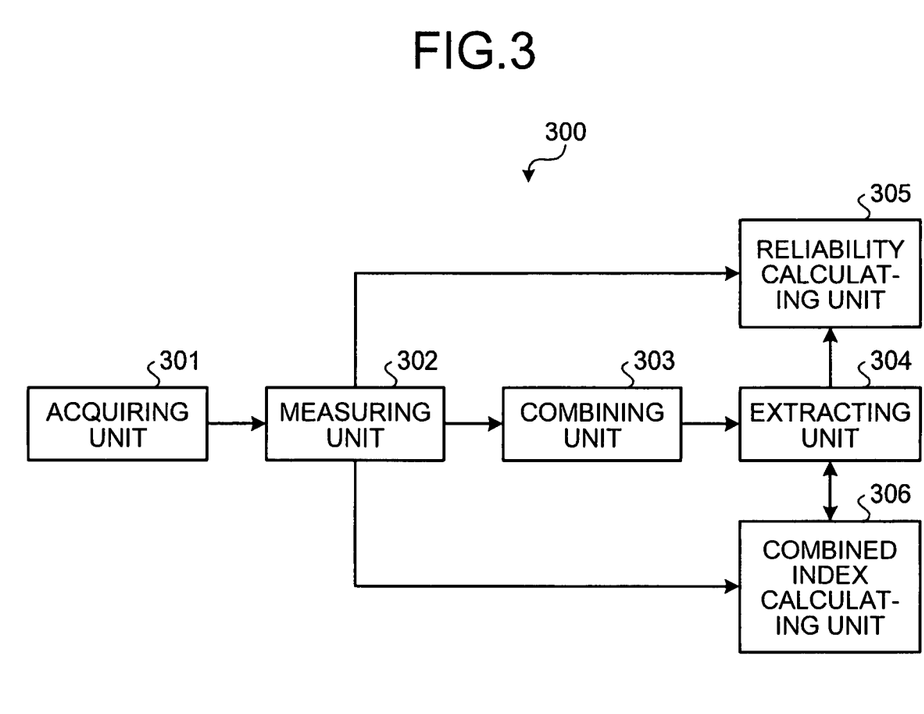
FIG. 3 is a block diagram of a functional configuration of the performance tuning apparatus.

FIG. 3 is a block diagram of a functional configuration of the performance tuning apparatus. A performance tuning apparatus 300 includes an acquiring unit 301, a measuring unit 302, a combining unit 303, an extracting unit 304, a reliability calculating unit 305, and a combined index calculating unit 306.

The acquiring unit 301 acquires plural pieces of input data to be given to a program to be tuned (hereinafter, "target program"). The target program includes plural functions. The functions are execution units (for example, "document.write( )") that identify the functions in the program.

The type of the input data differs depending on the target program. For example, when a target program is an image processing program, the input data is image data. When a target program is a sound processing program, the input data is sound data. When a target program is a file system, the input data is a file.

The measuring unit 302 measures for each input data performance index values for each function by giving the plurality of pieces of input data acquired by the acquiring unit 301 respectively to the target program and executing the target program. A performance index value is a value indicative of the performance of a function, and, for example, can be represented by the number of cycles and a cache mistake rate. For example, when input data is given to a target program, the performance index value of a function in the target program for the input data is the number of cycles obtained when the function is executed.

Figure 4:
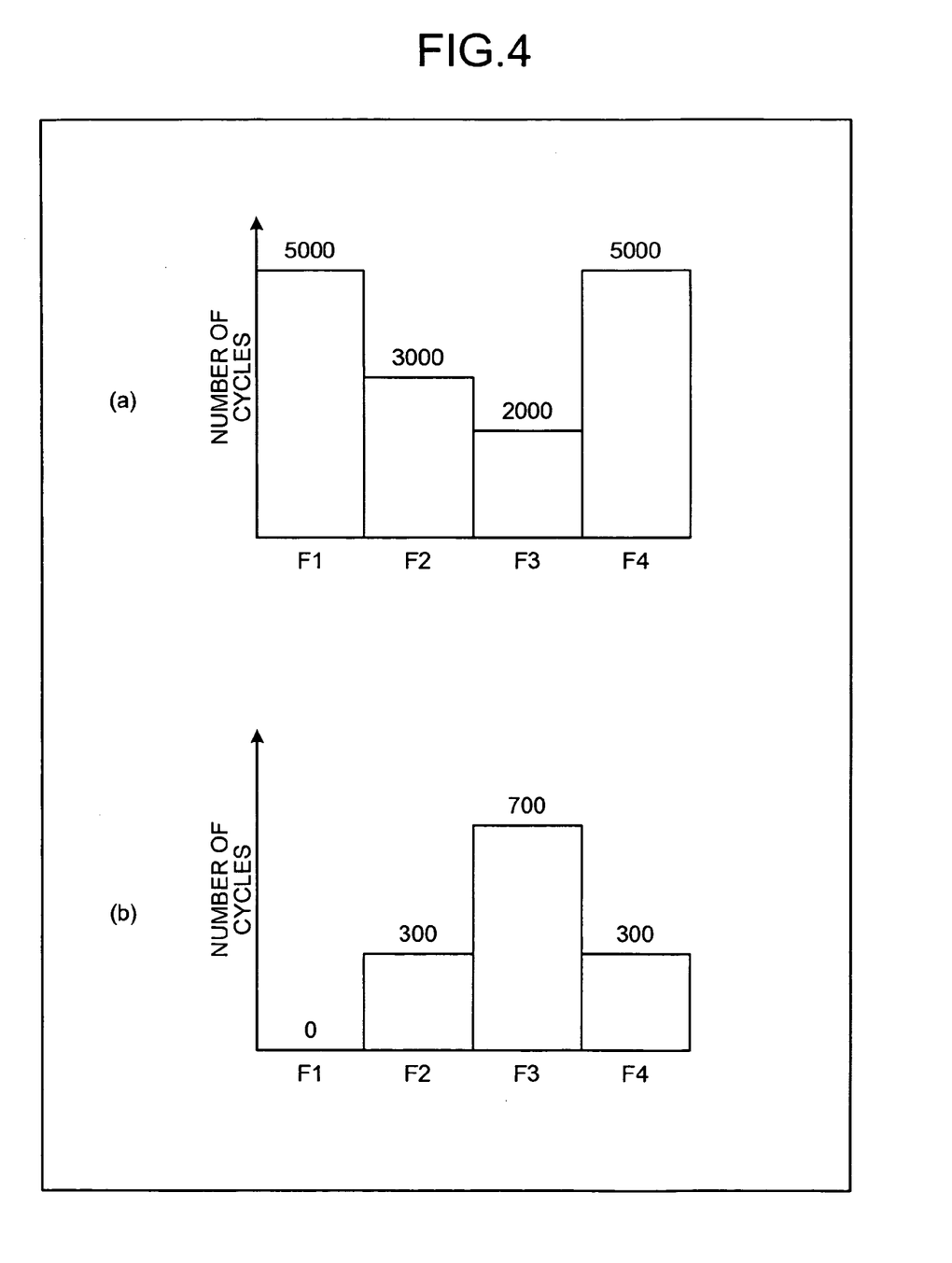
FIG. 4 illustrates graphs of performance indexes for each function.

FIG. 4 illustrates graphs of performance indexes for each function. The graphs express performance index values (the number of cycles in this example) of each function when two different types of data, data D1 and data D2 in this example, are given respectively to the target program. Hereinafter, an i-th input data is referred to as "data Di" (i=1 to n, where n is the total number of the input data).

A graph (a) shown in FIG. 4 indicates the number of cycles of functions F1 to F4 in the target program when the data D1 is given. A graph (b) shown in FIG. 4 indicates the number of cycles of functions F1 to F4 in the target program when the data D2 is given.

Although the cases for the functions F1 to F4 are shown as the examples, the number of functions varies depending on the target program. For example, several hundred to several thousand functions exist. Hereinafter, a f-th function is referred to as "function Fj" (j=1 to m, where m is the total number of functions of the target program).

The combining unit 303 shown in FIG. 3 combines for each function the performance index value of each input data measured by the measuring unit 302. The combined performance index value $S_j$ for each function $F_j$ that is the result of the combining can be expressed as in Equation 1 below.

$$S_j = C_1 \cdot M_{j1} + C_2 \cdot M_{j2} + \ldots + C_i \cdot M_{ji} + \ldots + C_n \cdot M_{jn} \qquad (1)$$

In Equation 1, $C_i$ represents a weighting coefficient set using attribute information on the input data $D_i$. The weighting coefficient $C_i$ can be defined arbitrarily taking into consideration the attribute information. $M_{ji}$ is a performance index of the function $F_j$ when the data $D_i$ is given.

A specific example of the weighting coefficient $C_i$ will be described.

EXAMPLE 1

Weighting with a Data Size (Amount to Be Processed) $z_i$ of the Input Data $D_i$ For example, when the data size (amount to be processed) $z_i$ of each data $D_i$ is significantly different, the input data $D_i$ can be re-combined as a process per unit data amount by, for example, normalizing with the data size zi. In this case, the weighting coefficient Ci can be expressed as in Equation 2 below.

$$C_i = 1/z_i \quad (2)$$

When the target program is an image processing program, the input data Di are image data. Therefore, the data size zi of the input data Di that is an image data is the image data size. For example, assuming that the data size z1 of the input data D1 is z1=600 [pixel], the data size z2 of the input data D2 is z2=1000 [pixel], and the data size z3 of an input data D3 is z3=200 [pixel], a combined performance index value Sj for each function Fj that is the result of the combining is expressed as in Equation 3 below.

$$S_j = (1/600) \times M_{j1} + (1/1{,}000) \times M_{j2} + (1/200) \times M_{j3} \quad (3)$$

When the target program is a sound processing program, the input data Di is sound data. Therefore, the data size zi of the input data Di that is a sound data is the length of the sound data. For example, assuming that the data size z1 of the input data D1 is z1=1.5 [sec], the data size z2 of the input data D2 is z2=5.2 [sec], and the data size z3 of the input data D3 is z3=3.0 [sec], the combined performance index value Sj for each function Fj that is the result of the combining is expressed as in Equation 4 below.

$$S_j = (1/1.5) \times M_{j1} + (1/5.2) \times M_{j2} + (1/3.0) \times M_{j3} \quad (4)$$

When the target program is a file system, the input data Di is file. Therefore, the data size zi of the input data Di that is a file is the size of the file. For example, assuming that the data size z1 of the input data D1 is z1=20 [KB], the data size z2 of the input data D2 is z2=500 [KB], and the data size z3 of the input data D3 is z3=2 [KB], the combined performance index value Sj for each function Fj that is the result of the combining is expressed as in Equation 5 below.

$$S_j = (1/20) \times M_{j1} + (1/500) \times M_{j2} + (1/2) \times M_{j3} \quad (5)$$

EXAMPLE 2

Weighting with Characteristics of Input Data Di

A PostScript process of a printer has a characteristic that the input data Di is often input in a text format and is rarely input in the form of a JPEG image. In this case, weighting can be executed with an input frequency qi, etc. The weighting coefficient Ci can be expressed as in Equation 6 below.

$$C_i = q_i \quad (6)$$

For example, assuming that an input frequency q1 of the input data D1 in a text format is q1=90[%] and an input frequency q2 of the input data D2 in the form of the JPEG image is q1=5[%], the combined performance index value Sj for each function Fj that is the result of the combining is expressed as in Equation 7 below.

$$S_j = 0.9 \times M_{j1} + 0.05 \times M_{j2} \quad (7)$$

EXAMPLE 3

Weighting with the Covering Property (Coverage Rate vi) of an Execution Route of the Input Data Di For example, for a program of which the execution route differs significantly depending on an input data, weighting can be executed with the coverage rate vi because the covering property of the execution route is taken into consideration. In this case, the weighting coefficient Ci can be expressed as in Equation 8 below.

$$C_i = v_i \quad (8)$$

For example, assuming that a coverage rate v1 of the function Fj obtained when the input data D1 is given is v1=80[%], a coverage rate v2 of the function Fj obtained when the input data D2 is given is v2=20[%], and a coverage rate v3 of the function Fj obtained when the input data D3 is given is v3=50 [%], the combined performance index value Sj for each function Fj that is the result of the combining is expressed as in Equation 9 below.

$$S_j = 0.8 \times M_{j1} + 0.2 \times M_{j2} + 0.5 \times M_{j3} \quad (9)$$

Figure 5:
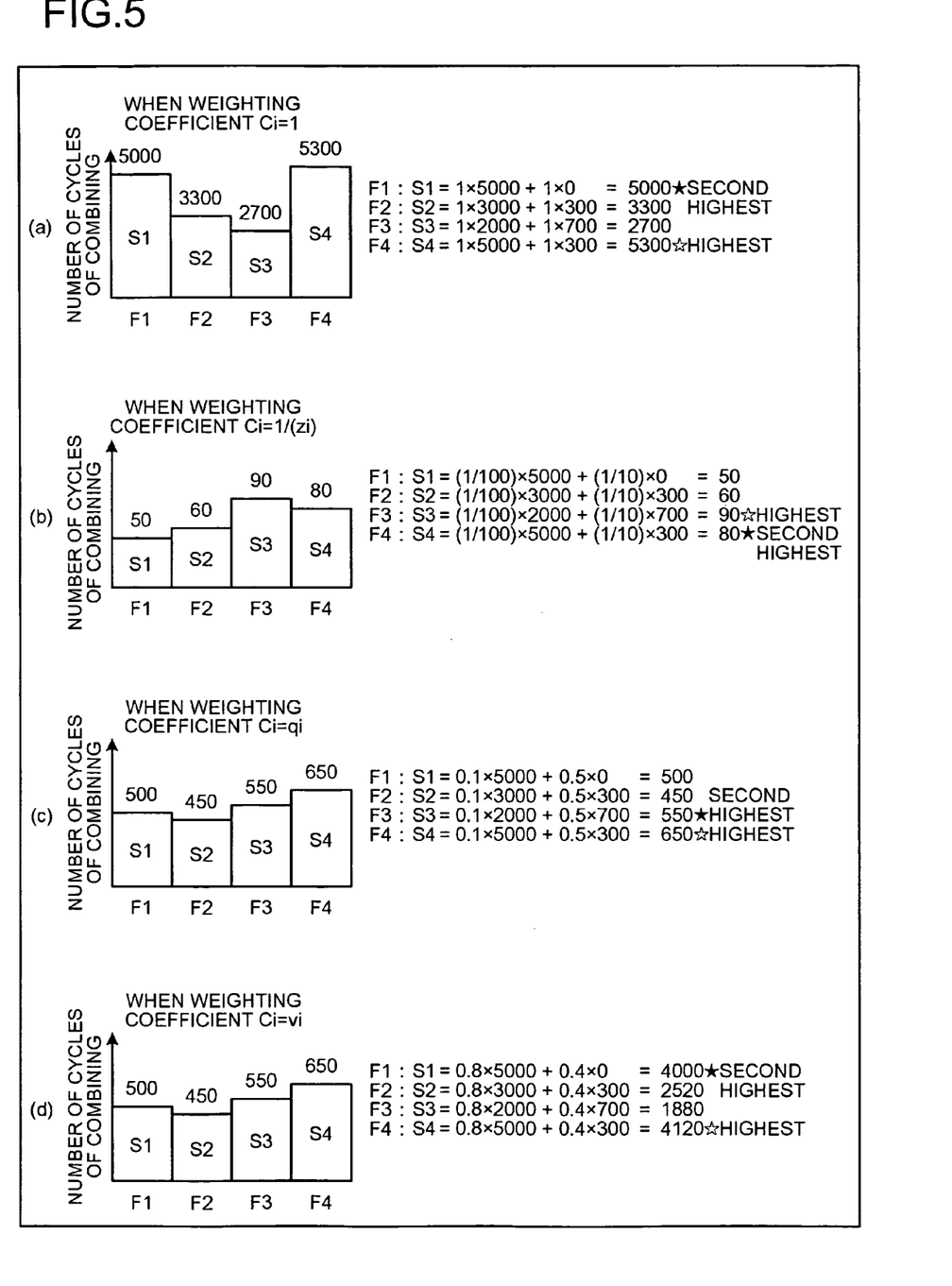
FIG. 5 is a schematic for illustrating results of combining by a combining unit.

The result of the combining (combined performance index value Sj) will be described in detail. FIG. 5 is a schematic for illustrating the results of the combining by the combining unit 303. The results shown in FIG. 5 are created by combining the performance indexes (the number of cycles) shown in FIG. 4. The combined number of cycles is referred to as "combined number of cycles".

A diagram (a) shown in FIG. 5 indicates combined performance index values S1 to S4 obtained when the weighting coefficient Ci is Ci=1, that is, when the weighting is not executed.

A diagram (b) shown in FIG. 5 indicates the combined performance index values S1 to S4 obtained when the attribute information on the input data Di is the data size (amount to be processed) zi of the input data Di.

A diagram (c) shown in FIG. 5 indicates the combined performance index values S1 to S4 obtained when the attribute information on the input data Di is the input frequency qi of the input data Di.

A diagram (d) shown in FIG. 5 indicates the combined performance index values S1 to S4 obtained when the attribute information on the input data Di is the coverage rate vi of the function Fj when the input data Di is given.

The extracting unit 304 shown in FIG. 3 extracts functions to be the candidates for the tuning point (hereinafter, "candidate tuning points") of the target program from the functions F1 to Fm based on the result of the combining (combined performance index value Sj) for each function Fj combined by the combining unit 303.

Specifically, a threshold St may be set, and a function Fx having the combined performance index value Sj thereof that is equal to or larger than the threshold St may be extracted. Alternatively, from combined performance index values S1 to Sm of functions F1 to Fm, functions F1 to Fy respectively having combined performance index values S1 to Sy that are top y (y=1, 2, . . . ) combined performance indexes may be extracted. Hereinafter, candidate tuning points Fx and F1 to Fy are collectively referred to as "candidate tuning point Fk".

For example, in the example shown in FIG. 5, the candidate tuning points Fk are extracted by identifying the top two combined performance index values. That is, in the example shown in the diagram (a), the function F4 (the highest) and the function F1 (the second highest) are extracted as the candidate tuning points Fk.

In the example shown in the diagram (b), the function F3 (the highest) and the function F4 (the second highest) are extracted as the candidate tuning points Fk.

In the example shown in the diagram (c), the function F4 (the highest) and the function F3 (the second highest) are extracted as the candidate tuning points Fk.

In the example shown in the diagram (d), the function F4 (the highest) and the function F1 (the second highest) are extracted as the candidate tuning points Fk.

The reliability calculating unit 305 shown FIG. 3 calculates reliability E of the result of the combining (combined performance index value Sj) based on the number of times of measurement of the performance index values measured by the measuring unit 302. Specifically, the total number "n" of the input data Di handled by the combining unit 303 is the reliability E. This reliability E can be used as an index of the tuning precision by presenting the reliability E as additional information because the reliability E corresponds to the total number of the performance index values that have experienced combining.

The combined index calculating unit 306 shown in FIG. 3 calculates an index value for judging the tuning for the candidate tuning points Fk (hereinafter, "combined index value Tk") based on a performance index value Mki for each input data Di of the candidate tuning point Fk.

Figure 6:
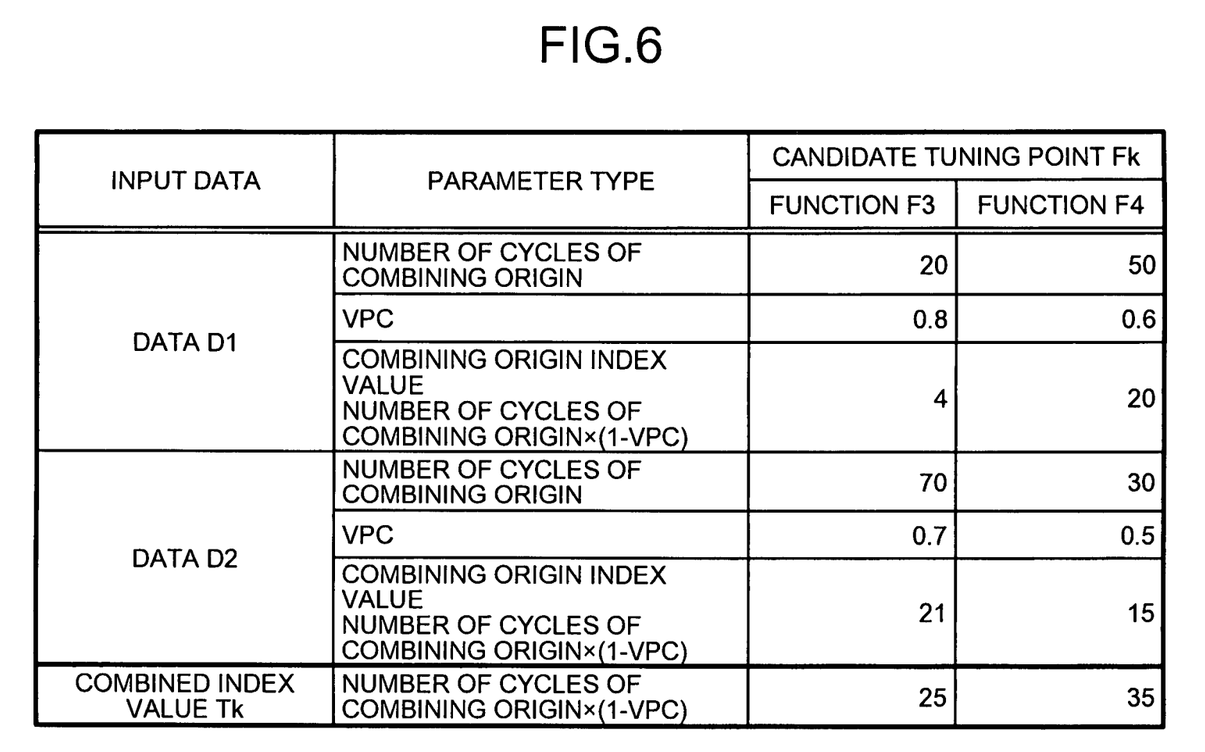
FIG. 6 is a calculation chart of a combined index.

An example of the calculation of this combined index value will be described. FIG. 6 is a calculation chart of the combined index value. FIG. 6 illustrates an example of the calculation of the combined index value obtained when the functions F3 and F4 are extracted as the candidate tuning points Fk in the example shown in the diagram (b) in FIG. 5.

The number of cycles of a combining origin shown in FIG. 6 is the number of cycles indicated by the performance index value Mki weighted by the weighting coefficient Ci during the combining by the combining unit 303 when the performance index value Mki is represented by the number of cycles.

For example, in the example shown in the diagram (b) in FIG. 5, the number of combination cycles of the input data D1 in the function F3 is 20. However, this number of combined cycles is a product of the weighting coefficient C1=1/100 of the input data D1 and the performance index value M1=2000 (see graph (a) in FIG. 4) of the input data D1 in the function F3.

An operation rate VPC is a value obtained as the number of VLIW instructions/the number of cycles. In the example shown in FIG. 6, the operation rate VPC of the input data D1 for the function F3 is 0.8.

A combination origin index value is an index value for each input data Di that is the calculation origin of the combined index value Tk and is calculated for each candidate tuning point Fk. For example, even when the number of cycles of the function Fj is the largest in those of the functions F1 to Fm, room for the tuning is expected to be small if the operation rate of the function Fj is high. Therefore, the number of cycles of the combination origin and the operation rate VPC are combined. A calculation formula for this combining is expressed as in Equation 10 below.

$$\text{combination origin index value} = \text{number of cycles of combination origin} \times (1\text{-VPC}) \quad (10)$$

The combination origin index value of the input data D1 in the function F3 is 20×(1-0.8)=4. The combined index value Tk is the sum of the combination origin index values respectively for each input data Di and is calculated for each candidate tuning point Fk. The combined index value Tk in the function F3 is 4+21=25. The combined index value Tk for each candidate tuning point calculated may be displayed on the display 208 shown in FIG. 2 or may be printed and output by the printer 213.

In this case, the extracting unit 304 may extract a function to be the tuning point (hereinafter, "tuning point Fp") from the candidate tuning points Fk based on the combined index value Tk calculated.

A threshold T that is a criterion is set as the criterion for extraction of the tuning point Fp and a function Fv having the combined index value Tk that is equal to or larger than the threshold T may be extracted as the tuning point Fp. Alternatively, functions Fk of top w (w=1, 2, ... ) combined index values in the combined index values Tk may be extracted as the tuning points Fp.

For example, assuming that a function having the combined index value Tk that is the maximum is the tuning point Fp, in the example shown in the diagram (b) in FIG. 5, the combined index value of the function F3 is 25 and the combined index value of the function F4 is 35. Therefore, the function F4 having the higher combined index value is the tuning point Fp.

Thus, even when many candidate tuning points Fk are extracted, it is possible to narrow down to obtain the tuning point Fp, and improvement of the tuning precision can be facilitated.

Specifically, the acquiring unit 301, the measuring unit 302, the combining unit 303, the extracting unit 304, the reliability calculating unit 305, and the combined index calculating unit 306 described above realize the functions thereof by causing the CPU 201 to execute programs recorded on recording media such as the ROM 202, the RAM 203, and the HD 205, or by the I/F 209 shown in FIG. 2.

Figure 7:
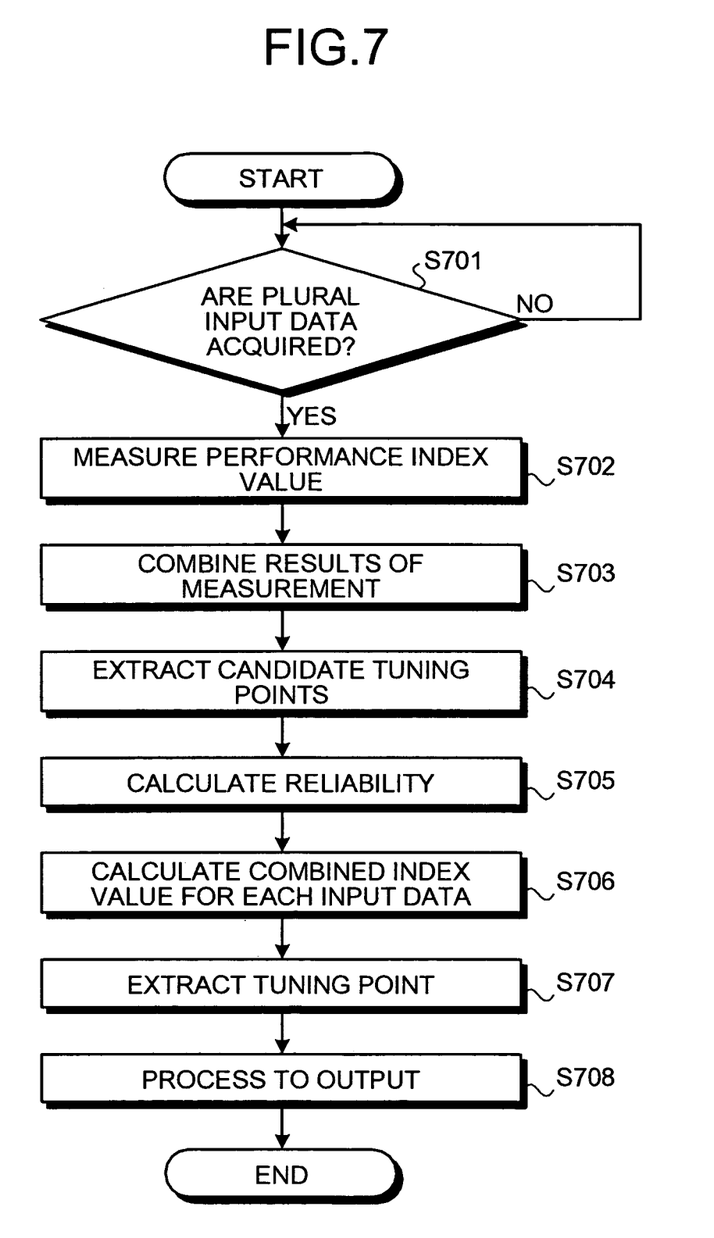
FIG. 7 is a flowchart of a performance tuning processing by the performance tuning apparatus.

FIG. 7 is a flowchart of a performance tuning processing by the performance tuning apparatus 300. As shown in FIG. 7, a plurality of pieces of input data Di are waited to be acquired by the acquiring unit 301 (step S701: NO) and, when the data Di are acquired (step S701: YES), the data Di are given to the target program and the target program is executed. The performance index value Mji for each function Fj is measured for each input data Di (step S702).

The result of the measurement (performance index value Mji) is combined for each function Fj by the combining unit 303 (step S703). The candidate tuning points Fk are extracted from the functions F1 to Fm based on the result of this combining (step S704).

In this manner, the candidate tuning points Fk can be easily found by extracting the candidate tuning points Fk using the result of the combining of the plurality of the input data Di. Thus, not only one type of performance when one certain input data is given is improved by improving the performance index values of the candidate tuning points Fk, but various types of performances for various input data Di can be evenly improved. Improvement of the reliability and the extraction precision of the candidate tuning points Fk can be facilitated by defining the weighting coefficient Ci.

Thereafter, the reliability E is calculated by the reliability calculating unit 305 (step S705). Thus, improvement of the reliability and the tuning precision of the candidate tuning points Fk can be facilitated. The combined index values Tk at the candidate tuning points Fk are calculated by the combined index calculating unit 306 for each input data Di (step S706). The tuning point Fp is extracted from the candidate tuning points Fk based on the result of the calculation (step S707).

An output process (output by displaying or printing) for the candidate tuning points Fk, the reliability E, and the tuning point Fp is executed (step S708). Thus, the series of processes is ended. As described above, although the room for the tuning may not be sufficiently considered when the candidate tuning points Fk are extracted using only one type of performance index value Mkj, the narrowing down of the candidate tuning points Fk can be executed and improvement of the extraction precision of the tuning point Fp can be facilitated by combining a plurality of types of performance index values Mki.

As described above, according to the embodiment described above, the candidate tuning points Fk can be extracted with high accuracy without the human judgment. In addition, not just performance of one certain input data is improved but performance of any input data can be equally improved. Moreover, designing period can be reduced and a load on design engineers can be reduced.

In the plurality of times of the performance measurement (for a plurality of pieces of input data Di), when the results of the measurement are combined as they are, that is, without considering the attribute information thereof, unfair combination is obtained. However, by combining after being weighted with the attribute information, fair combination can be obtained. Therefore, improvement of the reliability and the precision in the result of the combining (combined performance index value Sj) can be facilitated.

By outputting the reliability E as the additional information for the result of the combining (combined performance index value Sj), how many experiences the result of the combining (combined performance index value Sj) has accumulated therein and how high the reliability of the result is can be judged. Therefore, improvement of the extraction precision of the candidate tuning points Fk and the tuning point Fp can be facilitated.

Although the room for the tuning may not be sufficiently considered when the tuning point Fp is extracted using only one type of performance index value Mki, improvement of the extraction precision of the tuning point Fp can be facilitated by combining a plurality of types of performance index values Mki.

As described above, according to the performance tuning program, the recording medium storing the program, the performance tuning apparatus, and the performance tuning method of the present invention, improvement of the performance of the program and reduction of the load on the development engineers can be facilitated by accurately determining the tuning point, easily and efficiently in an automatic manner.

The performance tuning method described in the embodiment can be realized by executing a program prepared in advance on a computer such as a personal computer and a work station. This program is recorded on a computer-readable recording medium such as an HD, an FD, a CD-ROM, an MO, and a DVD, and is executed by being read from the recording medium by the computer. This program may be a transmission medium that can be distributed through a network such as the Internet.

According to the embodiments described above, it is possible to improve performance of a program and to reduce a load on development engineers by accurately finding a tuning point.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores therein a performance tuning program, the performance tuning program making a computer execute:
   acquiring a plurality of pieces of input data to be given to a target program that includes a plurality of functions;
   measuring a performance index value for each of the plurality of functions by executing the target program using each of the plurality of pieces of input data;
   calculating a combined performance index value for each of the plurality of functions by adding performance index values that are weighted based on attribute information of the input data;
   extracting functions to be candidates for a tuning point from among the plurality of functions based on the combined performance index value; and
   calculating reliability of a result of the calculating, the reliability being a total number of the input data handled by the calculating of the combined performance index value.

2. The non-transitory computer-readable recording medium according to claim 1,
   wherein the attribute information includes information indicative of coverage rate of execution routes of the target program with respect to the input data regarding execution routes of the target program.

3. The non-transitory computer-readable recording medium according to claim 2, comprising:
   calculating an index value for tuning judgment for the candidates based on the performance index value of the candidates.

4. The non-transitory computer-readable recording medium according to claim 3, comprising:
   extracting a function to be the tuning point from among the candidates based on the index value for tuning judgment.

5. A performance tuning apparatus comprising:
   a computer configured to:
      acquire a plurality of pieces of input data to be given to a target program that includes a plurality of functions;
      measure a performance index value for each of the plurality of functions by executing the target program using each of the plurality of pieces of input data;
      calculate a combined performance index value, for each of the plurality of functions, using performance index values that are weighted based on attribute information of the input data; and
      extract functions to be candidates for a tuning point from among the plurality of functions based on the combined performance index value, and
   wherein reliability of a result of the calculating is calculated, the reliability being a total number of the input data handled by the calculating of the combined performance index value.

6. A performance tuning method comprising:
   acquiring a plurality of pieces of input data to be given to a target program that includes a plurality of functions;
   measuring a performance index value for each of the plurality of functions by executing the target program using each of the plurality of pieces of input data;
   calculating a combined performance index value for each of the plurality of functions by adding performance index values that are weighted based on attribute information of the input data; and
   extracting functions to be candidates for a tuning point from among the plurality of functions based on the combined performance index value, and
   wherein reliability of a result of the calculating is calculated, the reliability being a total number of the input data handled by the calculating of the combined performance index value.

* * * * *